Feb. 21, 1950  S. WALD  2,498,597
CIRCUIT FOR MEASURING PHASE SHIFTS
Filed Dec. 21, 1948  2 Sheets-Sheet 1
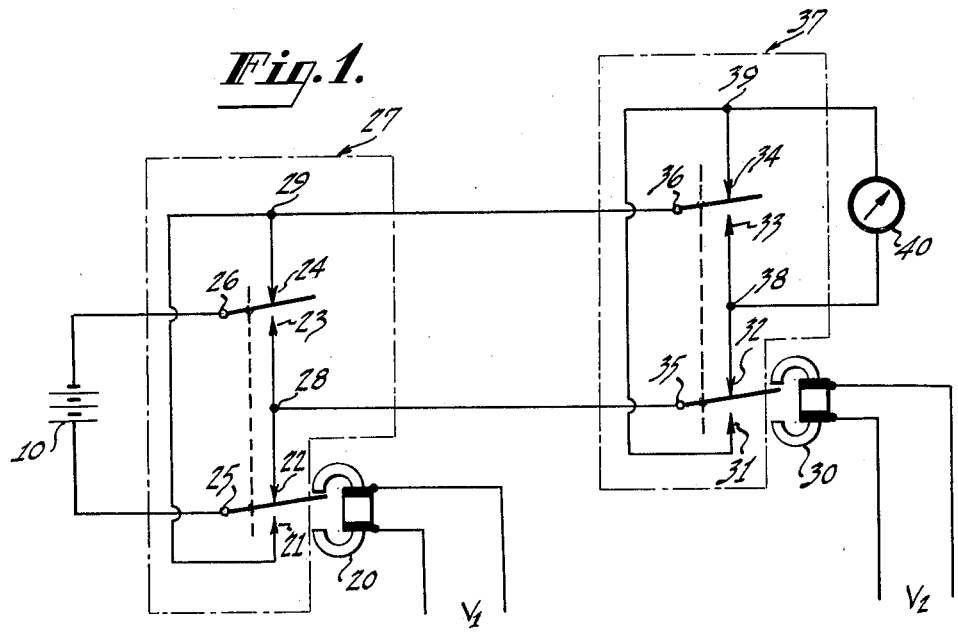
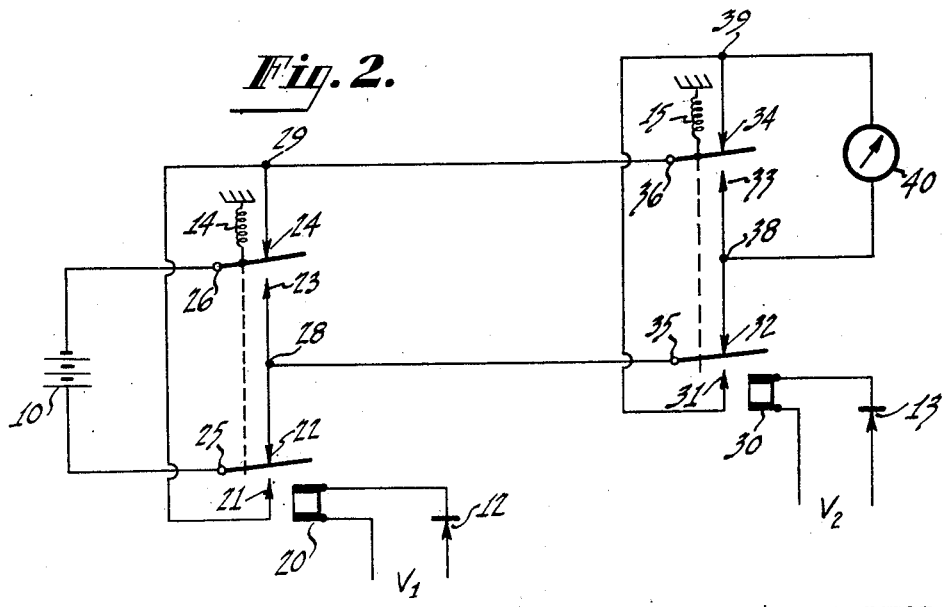
INVENTOR
SIDNEY WALD
BY
ATTORNEY

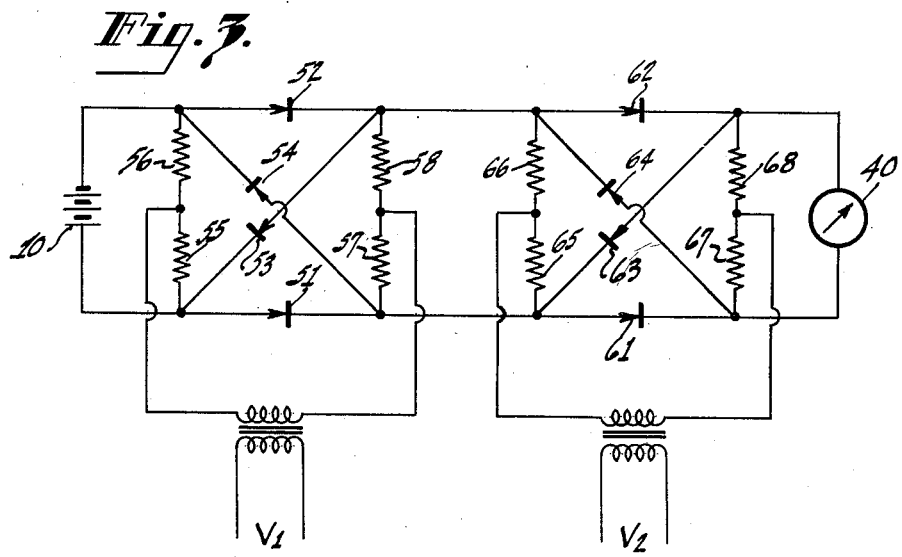
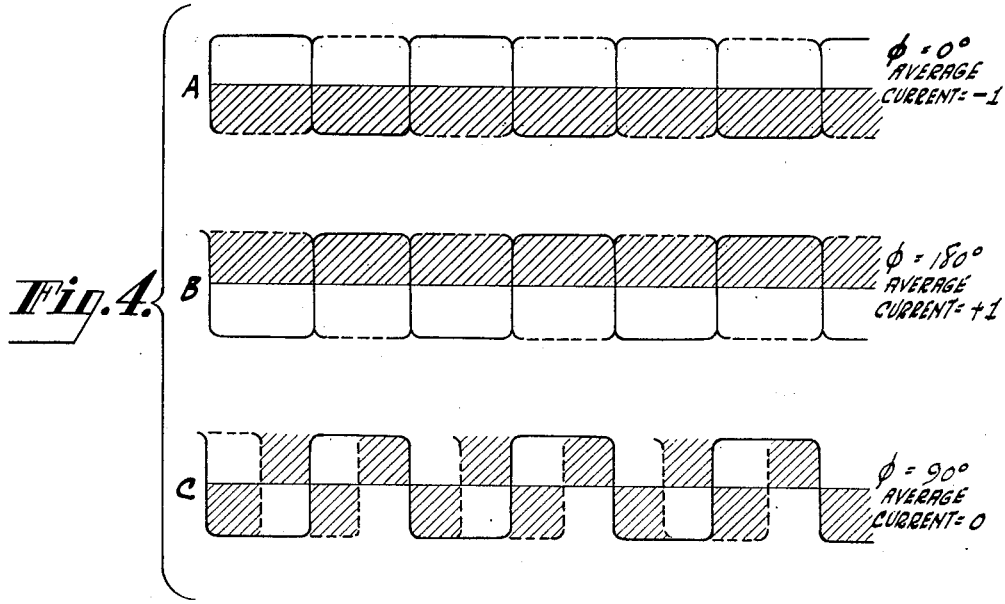

Patented Feb. 21, 1950

2,498,597

UNITED STATES PATENT OFFICE 2,498,597

CIRCUIT FOR MEASURING PHASE SHIFT

Sidney Wald, Collingswood, N. J., assignor to Radio Corporation of America, a corporation of Delaware Application December 21, 1948, Serial No. 66,554

6 Claims. (Cl. 172—245)

This invention relates to a system of and apparatus for comparing two alternating currents and more particularly to a system for determining their difference in phase, or their beat frequency.

Previous indicating instruments for measuring phase differences may be divided broadly into three classes: 1, Crossed-coil instruments of the Tuma type; 2, instruments incorporating thermionic tubes, either vacuum or thyratron types; and 3, differential galvanometer indicators actuated by relays or vacuum tube circuits.

Peterson in United States Letters Patent No. 1,984,585 shows a pair of gas filled tubes in a phase measuring device. In this arrangement, each of the voltages to be compared is utilized, through transformer connections, to control the grid of one thyratron and supply anode voltage to the other thyratron. The difference of the anode currents of the two tubes in such an arrangement is in proportion to the difference in phase of the controlling voltages.

Another prior art method teaches the use of two D'Arsonval indicating instruments on a common shaft, one of which is responsive through a rectifier to positive polarity voltage pulses, the other of which is responsive to positive current pulses selected by a polar relay which places the second meter across the same voltage pulses, but in synchronism with the current pulses to be compared. The summation of the two is accomplished by the mechanical positioning of the shaft in response to the magnetic torques thus produced.

Other arrangements include thermionic vacuum tube circuits which produce wave forms that may be compared for phase displacement regardless of input voltage or current considerations. Many such vacuum tube circuits are largely independent of frequency.

Another previously disclosed method suggests the use of the secondary half-windings of two split-secondary transformers connected to one winding of a differential galvanometer in aiding relationship, and to the other winding in opposing relationship, and effecting a summation in the magnetic field controlling the moving coil.

Each of these classes of instruments has its field of application, and has proved well suited in certain intended types of measurement of phase differences. Shortcomings, however, limit the application of each. Crossed-coil instruments give false indications if the frequency is changed, due to changes in the reactive and resistive components of the coil branches. Thermionic tube instruments are bulky, fragile, and usually require an external power supply. Differential galvanometer instruments require a more expensive indicating device.

My invention overcomes objections arising from the above, and provides a simple, rugged, self-contained, portable instrument for measuring phase difference. It is adaptable to cover a wide range of alternating currents with substantially no deviation due to frequency changes.

It is an object of this invention to provide a phase measuring and beat-frequency indicating device of simple construction, substantially independent of the magnitude of input voltages and currents, having a power supply independent of the alternating currents to be measured.

Another object of this invention is to provide a phase difference measuring device which will cover a wide range of frequencies with substantially no deviation due to frequency.

It is a further object of this invention to provide a phase measuring device which will be economical and easy to manufacture and which will afford an accuracy previously obtainable only with more complicated and expensive devices.

Briefly, in accordance with my invention for comparing phase difference or beat frequency of alternating currents, I have provided a source of potential connected across the input terminals of a first reversing circuit actuated in synchronism with one of the input voltages or currents, the output of which is connected to the input terminals of a second reversing circuit actuated in synchronism with the other input voltage or current to be compared, the output of which in turn is connected to a zero-center direct current indicating device. If the voltages or currents to be measured are in phase, reversal by both circuits will be in synchronism and in the same direction, giving current through the meter in one direction. If they are 180° out of phase electrically, the reversals will be in synchronism, but in opposite sense, giving current through the meter in the opposite direction. Intermediate conditions of phase displacment will give meter readings proportional to the phase displacement, as explained below. If there is a difference in frequency between the input voltages, the meter will oscillate at this beat frequency.

The invention, both as to its organization and method of operation, together with additional objects and advantages thereof, will best be understood by reference to the specification when read in connection with the accompanying drawing in which—

Figure 1 is a schematic diagram of one form of my invention;

Figure 2 is a schematic diagram of a modification of my invention;

Figure 3 is a schematic diagram which utilizes rectifying elements in lattice arrangement as reversing circuits; and Figure 4 shows current wave forms produced by the apparatus and measured by the same.

Referring to Figure 1, a source of fixed direct current potential 10, such as a battery, is connected to a first reversing circuit 27, which is controlled by a first input voltage $V_1$. A change in polarity of the input voltage $V_1$ will reverse the polarity of the direct-current voltage at the output terminals 28 and 29. The output terminals 28 and 29 of the first reversing circuit 27 are connected to a second reversing circuit 37, which is in turn controlled by a second input voltage $V_2$. The output terminals 38 and 39 of the second reversing circuit 37 are connected to a zero-center direct current indicating device 40, such as a direct current ammeter.

In the preferred embodiment of the invention shown in Figure 1, the reversing circuits are represented by double-armature, two-position, polarized relays 20 and 30 connected as shown in the drawing to reverse the polarity of the D. C. voltage at the output terminals with each change in polarity of the actuating voltages $V_1$ and $V_2$.

The first relay 20 may be any of several alternating current relays well known in the art, such as a split-reed synchronous vibrator or a polarized relay. Two armatures 25 and 26 are provided which are electrically insulated but mechanically ganged so that they act in synchronism. The first armature 25 cooperates with a contact 21 in a "front" position, and another contact 22 in a "back" position. The second armature 26 cooperates with a contact 23 in a "front" position, and another contact 24 in a "back" position. The terms "front" and "back" positions are used to differentiate the two positions the armature will assume, depending upon the direction of current flow in the relay windings. The second relay 30 is similar to the first relay 20, having two electrically insulated, mechanically ganged armatures 35 and 36. On this second relay 30, the first armature 35 cooperates with a contact 31 in a "front" position, and another contact 32 in a "back" position. The second armature 36 of the second relay 30 cooperates with a contact 33 in a "front" position, and another contact 34 in a "back" position.

In Figure 2, a circuit similar to that shown in Figure 1 is provided but a modification in the input circuits to the controlling relay windings allows the use of neutral spring-biased relays. The modification consists of half-wave rectifying elements 12 and 13 inserted in series with the windings of the two relays 20 and 30. Current flowing in one direction would be offered little resistance by the rectifying elements 12 and 13 and would magnetize the relay and pull the armatures 25, 26, 35 and 36 into a "front" position. Current flowing in the opposite direction would be offered great resistance and sustantially little current would flow, consequently the armatures would not be magnetically attracted, and spring biasing means 14 and 15 would hold the armatures in "back" condition. This would result in the same operation as the use of polarized relays.

In Figure 3, which illustrates a modification falling within the scope of my invention, the mechanical relays are replaced by lattice networks. In the first reversing circuit, rectifying elements 51, 52, 53, and 54 and resistance elements 55, 56, 57, and 58 are connected as shown in the drawing. Two conduction paths are offered: the first when a positive voltage appears across resistance elements 57 and 58 in respect to that appearing across the other resistance elements 55 and 56, in which case rectifying elements 51 and 52 become conducting, and rectifying elements 53 and 54 non-conducting; and the second, when the polarity is reversed, in which case rectifying elements 53 and 54 become conducting, the other rectifying elements 51 and 52 appearing as open circuits, thus effectively reversing the direction of current flow at the output terminals of the network.

The second reversing circuit operates in the same way and has rectifying elements 61, 62, 63, 64 and resistance elements 65, 66, 67, and 68, similar to those of the first reversing circuit. The current wave form produced by the first reversing circuit is reversed in direction in synchronism with the second actuating voltage $V_2$ by the second network. The average value of the current wave is measured by a zero-center direct current indicating device 40.

The operation of the above circuits may best be understood by a reference to Figure 4, in which current wave forms are shown for three conditions of phase displacement of the controlling voltages. Curve A represents the output wave forms when $V_1$ and $V_2$ are in phase, and reversals take place in synchronism and in the same sense. The solid lines represent the output of direct current at the terminals 28 and 29 of the first reversing circuit. Dotted lines are shown to indicate reversals by the second reversing circuit, yielding a current at the output terminals 38 and 39 represented by the shaded area in curve A.

Curve B represents the output wave forms when the voltages $V_1$ and $V_2$ are 180° electrical degrees out of phase. The output of the first reversing circuit, represented by solid lines, is reversed in polarity by the second reversing circuit to yield an output current represented by the shaded area. When the reversals take place out of phase, the resultant average current is seen to be a maximum in the positive direction, as opposed to the in-phase condition shown by a curve A, which produced a negative maximum.

When the two voltages $V_1$ and $V_2$ are in phase quadrature, the average value of the output wave is zero as shown in curve C of Figure 4. Intermediate conditions of phase displacement will give an average current proportional to the degree of phase displacement. It is readily seen that a zero-center direct-current ammeter can be graduated to read phase displacement directly in electrical degrees.

More than two reversing circuits in tandem will prove valuable in polyphase circuits to indicate degree of phase unbalance of either voltages or currents. In three-phase measurement, phase unbalance of voltages or currents would be indicated by three such reversing circuits in tandem, six being required for six-phase circuits, and so on. The principle of operation is the same as that for two currents or voltages as described above.

It will be apparent to one skilled in the art that several modifications could be made without departing from the scope of the invention. The positions of the source of direct current and the indicating device could be interchanged with respect to the wiring configuration of the reversing circuits, and the same results obtained. Shunts or series resistances may be provided to adjust the maximum reading of the meter to the graduations, as required by loss of voltage or change in the direct-current source. A battery switch may be added to prevent power drain. Adjustable transformers for the input relays would make the relays responsive over a larger range of input voltages. A modulator composed of rectifying elements in a bridge arrangement instead of the lattice shown in Figure 3 would achieve the same result, but with a loss of sensitivity, since only half of the wave is utilized, and alternate half cycles would be shorted by the network. These additions or modifications are refinements lending only convenience in use and do not depart from the spirit and scope of the invention as stated in the appended claims.

I claim:

1. Apparatus for indicating the phase relationship between a plurality of alternating current voltages comprising, in combination a first relay actuated by and in synchronism with one of said voltages, a second relay actuated by and in synchronism with another of said voltages, each of said relays having a pair of ganged separately conducting armatures, each of said armatures having contacting surfaces alternately cooperative with front and back contacts; said relays connected as two reversing circuits, each circuit including two input terminals and two output terminals said input terminals constituting the said separate armatures of the same relay, one of said output terminals being connected to both the said front contact cooperating with a contacting surface of the said first armature and the said back contact cooperating with a contacting surface of the said second armature, the other of said output terminals being connected to both the said back contact cooperating with a contacting surface of the said first armature and the said front contact cooperating with a contacting surface of the said second armature; a source of fixed potential connected across the input terminals to said first reversing circuit; the output terminals of said first reversing circuit connected to the input terminals of said second reversing circuit; a direct current indicating device connected across the output terminals of said second reversing circuit.

2. Apparatus for indicating the phase relationship between a plurality of alternating current voltages comprising in combination a first relay actuated by and in synchronism with one of said voltages, a second relay actuated by and in synchronism with the other of said voltages, each of said relays being connected to reverse the direction of current flow between its input and output terminals with each alternation of said voltage actuating the said relay; a source of fixed potential connected across the input terminals to said first reversing circuit; the output terminals of said first reversing circuit connected to the input terminals of said second reversing circuit; and a direct current indicating device connected across the output terminals of said second reversing circuit.

3. Apparatus for indicating the phase relationship between a plurality of alternating current voltages comprising, in combination a first split-reed synchronous vibrator relay actuated by and in synchronism with one of said voltages, a second split-reed synchronous vibrator relay actuated by and in synchronism with the other of said voltages, each of said relays having a pair of ganged separate conducting armatures, each of said armatures having contacting surfaces alternately cooperative with front and back contacts; each of said relays being connected to reverse the direction of current flow between its input and output terminals with each alternation of said voltage actuating the said relay; a source of fixed potential connected across the input terminals to said first reversing circuit; the output terminals of said first reversing circuit connected to the input terminals of said second reversing circuit; a direct current indicating device connected across the output terminals of said second reversing circuit.

4. Apparatus for indicating the phase relationship between a plurality of alternating current voltages comprising, in combination a first audio frequency relay actuated by and in synchronism with one of said voltages, a second audio frequency relay actuated by and in synchronism with the other of said voltages, each of said relays having a pair of ganged separate conducting armatures; each of said armatures having contacting surfaces alternately cooperative with front and back contacts, each of said relays being connected to reverse the direction of current flow between its input and output terminals with each alternation of said voltage actuating the said relay; a source of fixed potential connected across the input terminals to said first reversing circuit; a connection between the output terminals of said first reversing circuit and the input terminals of said second reversing circuit; and a direct current indicating device connected across the output terminals of said second reversing circuit.

5. The method of indicating the phase relationship between alternating currents comprising: providing a source of direct current, and a plurality of sources of alternating currents, reversing the polarity of said direct current in synchronism with a first alternating current, reversing the polarity of the current wave thus produced in synchronism with a second alternating current, and indicating the average value of the wave thus produced.

6. The method of indicating the phase relationship between alternating currents comprising: providing a source of direct current and a plurality of sources of alternating currents, passing said direct current through a series of reversing circuits, reversing the current supplied to each reversing circuit in synchronism with a different one of said alternating currents, and indicating the average value of the wave thus produced.

SIDNEY WALD.

REFERENCES CITED

The following references are of record in the file of this patent:

UNITED STATES PATENTS

| Number | Name | Date |
|---|---|---|
| 508,489 | Scott | Nov. 14, 1893 |
| 1,680,739 | Kennedy | Aug. 14, 1921 |
| 2,118,483 | Woodman | May 24, 1938 |
| 2,217,477 | Gulliksen | Oct. 8, 1940 |